United States Patent [19]

Berlin et al.

[11] Patent Number: 5,280,135
[45] Date of Patent: Jan. 18, 1994

[54] OUTDOOR ELECTRICAL OUTLET COVER

[75] Inventors: Donald M. Berlin; Julius R. Rosenski, both of McHenry, Ill.

[73] Assignee: Intermatic Incorporated, Spring Grove, Ill.

[21] Appl. No.: 742,743

[22] Filed: Aug. 9, 1991

[51] Int. Cl.⁵ .......................................... H01R 13/447
[52] U.S. Cl. ...................................... 174/67; 439/147
[58] Field of Search .......................... 174/67; 220/242; 439/142, 144, 147, 136

[56] References Cited

U.S. PATENT DOCUMENTS

| | | | |
|---|---|---|---|
| 2,510,745 | 6/1950 | Kilgore | 174/48 |
| 2,526,606 | 10/1950 | Gregg | 174/67 |
| 2,880,264 | 3/1959 | Ruskin | 174/67 |
| 2,916,733 | 12/1959 | Hirsch | 340/545 |
| 3,200,989 | 8/1965 | Hubbell | 220/242 |
| 3,236,990 | 2/1966 | Bates | 200/302.3 |
| 3,252,611 | 5/1966 | Weitzman et al. | 220/242 |
| 3,288,910 | 11/1966 | Zerwes | 174/53 |
| 3,716,815 | 2/1973 | Riches | 439/142 |
| 4,109,095 | 8/1978 | Kling et al. | 174/67 |
| 4,135,337 | 1/1979 | Medlin | 52/221 |
| 4,197,959 | 4/1980 | Kramer | 220/242 |
| 4,265,365 | 5/1981 | Boteler | 220/3.3 |
| 4,342,493 | 8/1982 | Grenell | 339/44 M |
| 4,381,063 | 4/1983 | Leong | 220/242 |
| 4,424,407 | 1/1984 | Barbic | 174/67 |
| 4,500,008 | 2/1985 | Cook | 220/242 |
| 4,505,403 | 3/1985 | Bowden, Jr. et al. | 220/242 |
| 4,603,932 | 8/1986 | Heverly | 339/39 |
| 4,605,817 | 8/1986 | Lopez | 174/67 |
| 4,733,330 | 3/1988 | Tanaka et al. | 361/356 |
| 4,803,307 | 2/1988 | Shotey | 174/67 |
| 4,874,906 | 10/1989 | Shotey | 174/67 |
| 4,915,638 | 4/1990 | Domian | 439/142 |
| 4,988,832 | 1/1991 | Shotey | 174/67 |
| 5,045,640 | 9/1991 | Riceman | 174/67 |

FOREIGN PATENT DOCUMENTS

3710306A1 6/1988 Fed. Rep. of Germany.

Primary Examiner—Leo P. Picard
Assistant Examiner—David Tone
Attorney, Agent, or Firm—Willian Brinks Olds Hofer Gilson & Lione

[57] ABSTRACT

An outdoor weatherproof protective electrical outlet cover adapted to be attached in weatherproof connection to an electrical outlet comprising a base plate adapted to be attached in weatherproof connection with the electrical outlet, the base plate having an aperture of sufficient size to accommodate the electrical outlet positioned in a first orientation and a second orientation wherein only one electrical outlet orientation can be accommodated at a given time, an insert sized and adapted to fit within the aperture of the base plate in a first orientation and a second orientation, the aperture being of sufficient size to accommodate one electrical outlet orientation, and a protective housing defining a closed space enclosing the electrical outlet with at least one electrical plug present, the protective housing adapted to be mounted to the base plate. Also included is a latching mechanism for an outdoor outlet cover adapted to secure the housing in a closed position with respect to the base and having an optionally removable release button to facilitate opening of the cover.

19 Claims, 4 Drawing Sheets

OUTDOOR ELECTRICAL OUTLET COVER

FIELD OF THE INVENTION

The present invention relates to a weatherproof electrical outlet cover. More particularly, this invention relates to an improved weather-resistant electrical outlet cover capable of accommodating various types of electrical outlets and switches and in various orientations.

BACKGROUND OF THE INVENTION

It is commonplace to have electrical outlets placed outdoors in order to supply the electricity required by outdoor lighting, outdoor yard equipment, outdoor recreation equipment, and the like. Where electrical outlets are placed outdoors, the damaging effects of weather conditions require a weather-resistant outdoor electrical outlet cover.

Certain types of outdoor electrical outlet covers provide weather resistant protection not only for the outlet receptacle, but also provide for an appliance to be plugged into the outdoor receptacle while maintaining weather-resistant protection to both the receptacle and the appliance plug. This feature is convenient because it is sometimes preferred to leave certain outdoor appliances plugged into an outdoor outlet for extended periods of time. Examples of such appliances include outdoor lighting such as spotlights. Even when an appliance is not intended to be left plugged in for an extended period of time, it is also sometimes preferred to provide weather resistant protection for the appliance plug during use.

One type of outdoor electrical outlet cover is designed for use with a vertically aligned electrical outlet. For example, U.S. Pat. No. 4,424,407 describes a weatherproof outdoor electrical outlet cover secured to an electrical outlet. The outlet cover described in the '407 patent is a rectangular structure with a gap in the bottom wall through which an electrical cord may pass.

One of the disadvantages of this type of device is that only a vertically aligned electrical outlet may be satisfactorily protected from varying weather conditions. If the device described in the '407 patent were to be placed on a horizontally aligned electrical outlet, the opening for the appliance cord would no longer be oriented downward thereby creating a greater likelihood that water, moisture or other substances would enter the protected area. Accordingly, such a cover would be unsuitable for protecting horizontally aligned electrical outlets.

Even if the outlet cover, such as the one described in the '407 patent were to be adapted for use with a horizontally aligned electrical outlet, it would require a manufacturer to make an entirely separate line of outlet covers, one for horizontal outlets and one for vertical outlets. Also, retailers would have to stock both types. This could lead to greater costs associated with manufacturing and stocking more product lines. Moreover, when a consumer is considering purchase of an outlet cover, he must remember the orientation of the outlet for which the cover is intended.

Another example of a outlet cover for outdoor applications is shown in U.S. Pat. No. 4,109,095. The device described in the '095 patent is a more complex weatherproof electrical outlet box cover. The box cover contains a pair of spring biased lids which fit together to seal an electrical cord extending out of the cover. The two lids contain an interlocking gear mechanism in order to synchronize the movement of the two lids. While this '095 device is capable of enclosing a horizontally or vertically aligned outlet, this outlet cover is relatively complicated and requires a large number of parts. Moreover, the outlet cover described in the '095 patent prevents easy accessibility for the insertion of an electrical plug.

Another disadvantage of prior outdoor outlet covers is that the outlet covers described above are designed for use with only one specific electrical outlet configuration, i.e., a standard duplex or a Decora style outlet. Even if the cover were a broad enough design to protect more than just one style, it would not be capable of use with both single-gang and/or double-gang size outlet boxes.

Therefore, a simple and more versatile weatherproof outdoor electrical outlet cover is needed.

SUMMARY OF THE INVENTION

An outdoor electrical outlet cover has been invented that overcomes the above-identified problems. The outdoor outlet cover includes a base plate to be mounted on an outdoor electrical outlet with an insert member mounted within an aperture present in the base plate. A protective housing is fastened to the base plate in order to enclose the electrical outlet. The base plate has an aperture adapted to encompass an insert. The insert may be fitted in the aperture of the base plate in a plurality of orientations in order to encompass electrical outlets of either a horizontal orientation or a vertical orientation. Also, different inserts may be provided to fit a plurality of electrical outlet configurations with respect to a fixed base plate position. The protective housing is connected to the base plate and defines a closed space of sufficient size to enclose an electrical outlet with at least one plug inserted thereinto irrespective of the orientation of the electrical outlet. At least one gap is present in the base plate and the protective housing through which an electrical cord may pass. The bottom of the base plate and the protective housing define a gap directed downward regardless of the orientation of the enclosed electrical outlet. The gap allows an electrical plug to remain inserted into the electrical outlet and the appliance cord to extend out of the housing while the protective housing is closed, thereby protecting the outlet and plug from various weather conditions.

It is a primary object of this invention to provide a simple and more versatile outdoor electrical outlet cover capable of protecting electrical outlets in varying orientations and in a variety of styles and sizes. This invention is more efficient and versatile than the prior art. The advantages of the invention as well as the invention itself, will be best understood by reference to the drawings, a brief description of which is as follows.

DETAILED DESCRIPTION OF THE PREFERRED EMBODIMENTS OF THE INVENTION

Figure 1:
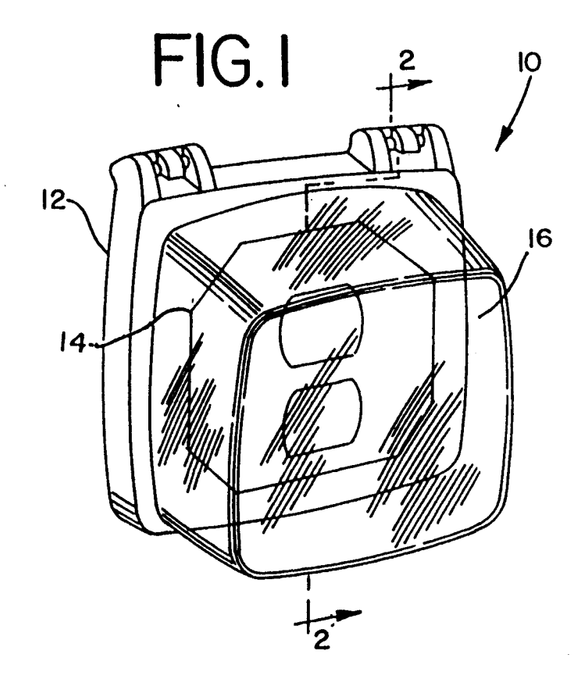
FIG. 1 is a perspective view of a weatherproof outdoor electrical outlet cover according to a first embodiment.
Figure 2:
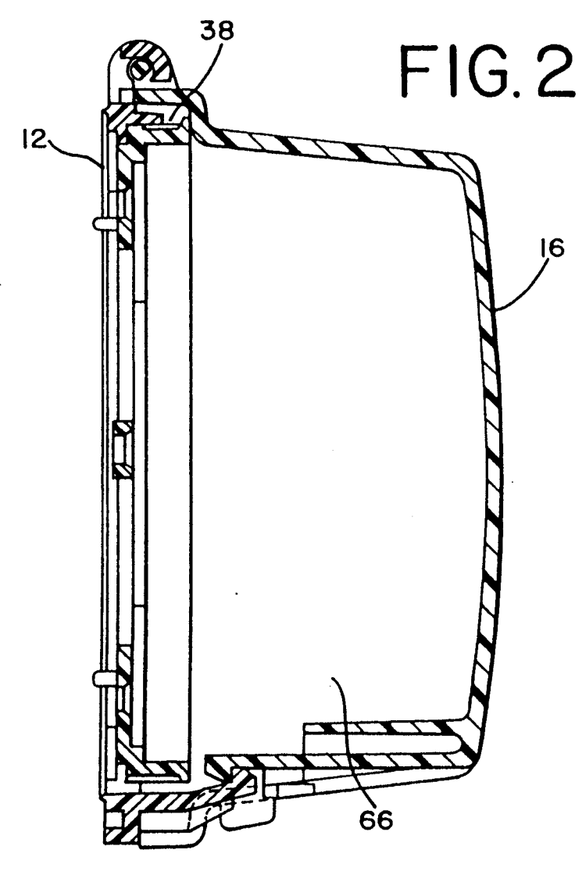
FIG. 2 is a sectional view taken along the lines 2—2 of FIG. 1.
Figures 3, 4:
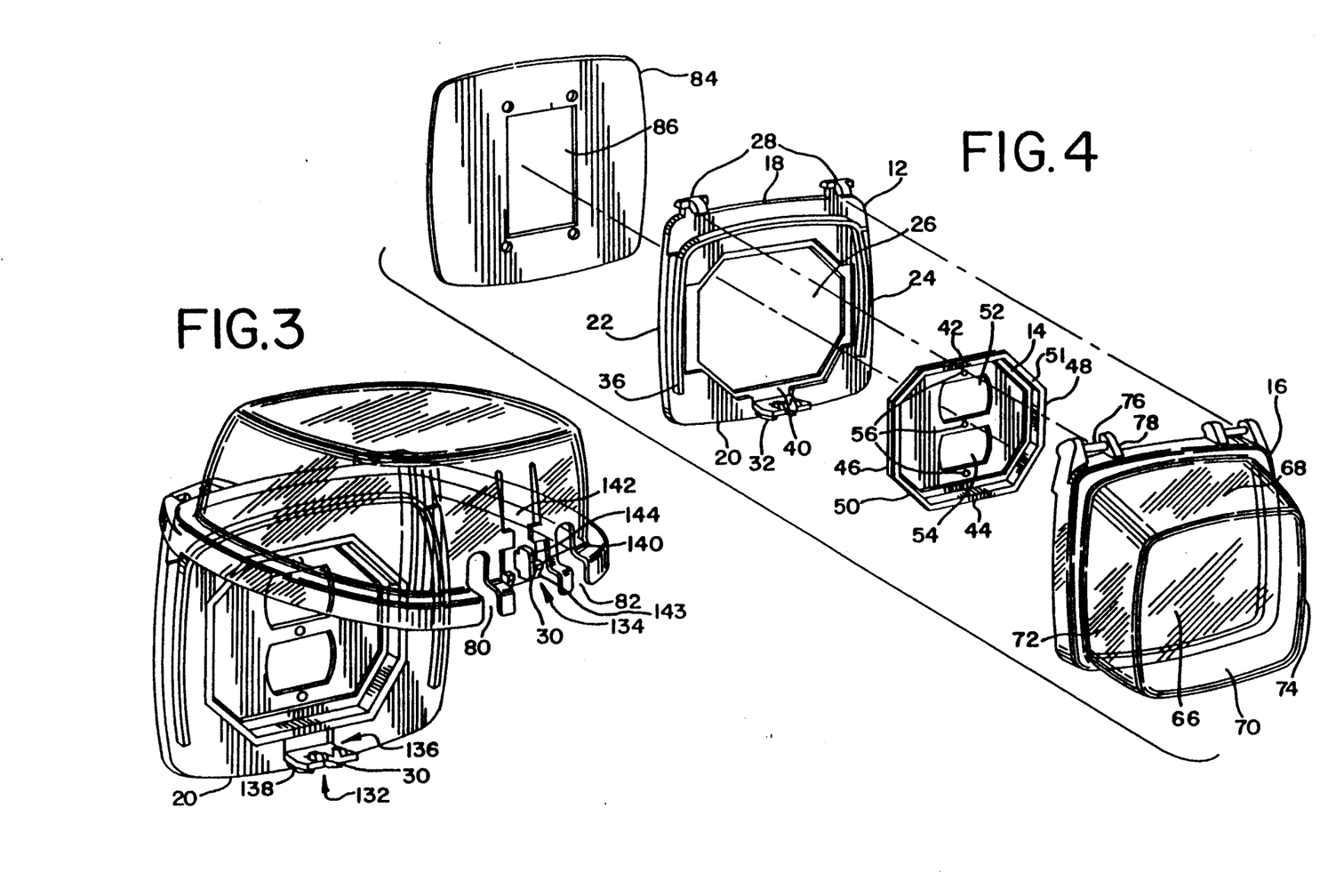
FIG. 3 is another perspective view of the first embodiment of FIG. 1.
FIG. 4 is a perspective view of the embodiment of FIGS. 1-3 in an exploded relationship.
Figure 5:
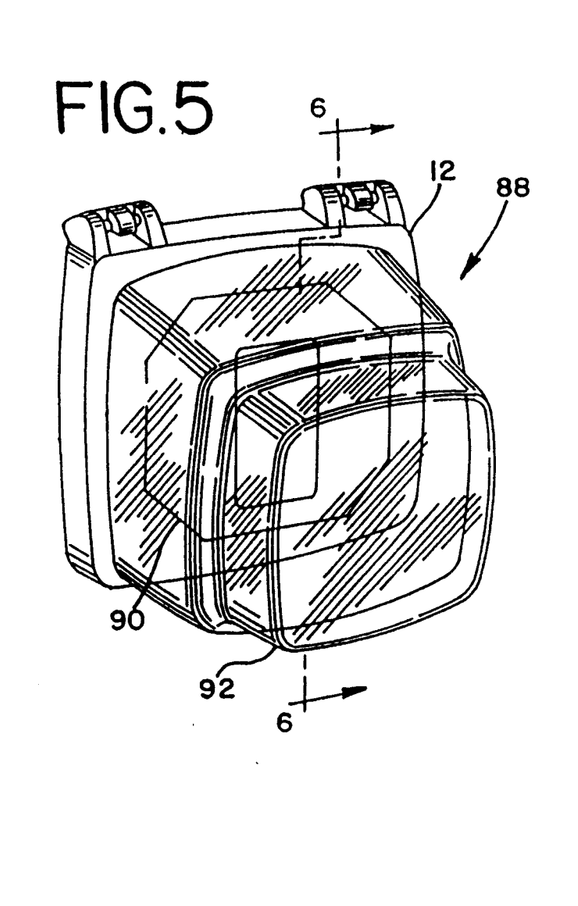
FIG. 5 is a perspective view of a weatherproof outdoor electrical outlet cover according to a second embodiment.
Figure 6:
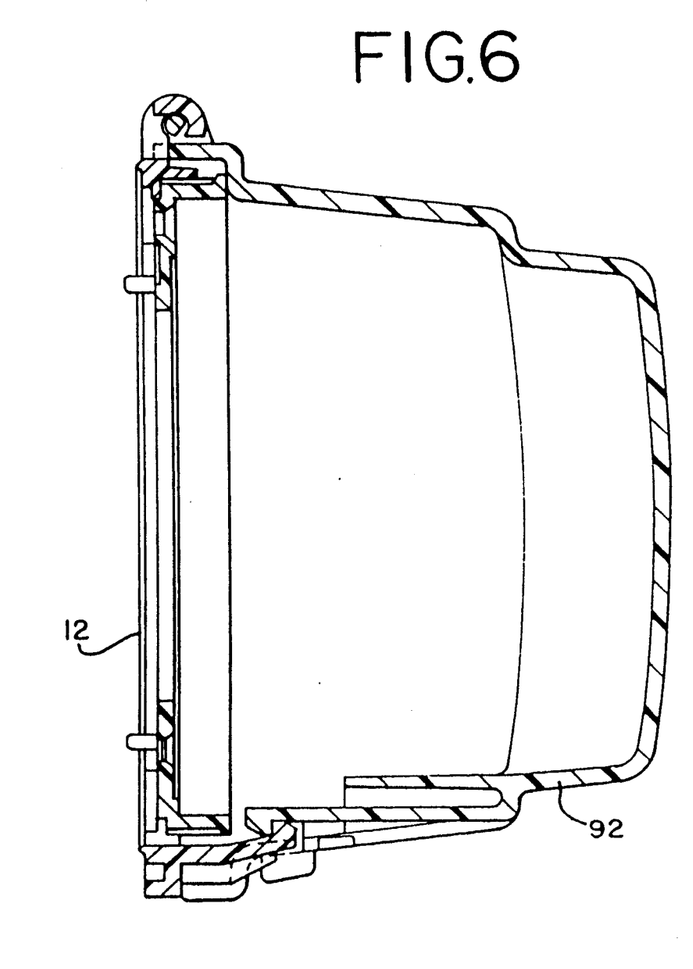
FIG. 6 is a sectional view taken along the lines 6—6 of FIG. 5.

FIG. 1 shows a first embodiment of an outdoor weather resistant electrical outlet cover assembly 10. The assembly 10 includes a base plate 12, an insert (in shadow) 14, and a protective housing 16. As best seen in FIGS. 2-4, the base plate 12 comprises a generally flat base with a top side 18, a bottom side 20 and two side walls 22 and 24. The base plate 12 has an aperture 26 located centrally therein. The aperture 26 has a generally octagonal shape in this embodiment, although circular or polygonal shaped apertures, or apertures having other shapes, would not depart from the spirit of this invention. The aperture 26 is of sufficient size to encompass an electrical outlet in a plurality of styles and orientations, as explained in more detail below.

The base plate 12 is provided with hinges 28 along the top edge 18 of the base plate 12 to connect the protective housing 16 to the base plate 12 in a pivotal relationship. In a preferred embodiment, two hinges are provided. A latching mechanism 30 is provided to lockingly secure the protective housing 16 to the base plate 12 in a closed position, as will be described in more detail below.

A tongue-and-groove arrangement is associated with the base plate 12 and the protective housing 16 to provide a weather-resistant connection along at least a portion of facing surfaces of the base plate 12 and the protective housing 16 when the protective housing 16 is in a closed position with respect to the base plate 12. A tongue 36 is located around the top edge 18 and the two side walls 22 and 24 of the base plate 12. The tongue 36 acts in cooperation with a groove 38 located along the periphery of the protective housing 16. The tongue 36 in cooperation with the groove 38 acts as a rain guard or deflector.

In this embodiment, the insert 14 has a shape that conforms generally to the shape of the aperture 26. In this embodiment, the aperture 26 and the insert 14 are octagonal in shape and approximately 4 ¼ inches across. However, the aperture 26 and the insert 14 may be provided in shapes other than octagonal, such as rectangular, circular or polygonal, without departing from the spirit of this invention. The shape of the aperture and the insert are such that the insert 14 can be positioned in the aperture 26 in two separate orientations and that the two separate orientations are 90° apart. Thus, a single insert can be utilized with a single base plate but can be adapted for use to cover an electrical outlet that is oriented in either a vertical or an horizontal orientation. It can be appreciated that the aperture and the insert may be made in various shapes, both regular or irregular, provided that the insert may be positioned in the aperture of the base plate in two separate orientations to accommodate horizontally or vertically oriented outlet receptacles.

A recess 40 is located along the periphery of the aperture 26 in the base plate 12. The recess 40 is adapted and sized to accommodate the insert 14 in a plurality of orientations.

The insert 14 has a top edge 42, a bottom edge 44 and two side walls 46 and 48. A flange 50 extends around the periphery of the insert 14. The flange 50 is sized and adapted to fit securely within the recess 40 of the base plate 12 in order to form a connection with the base plate 12. A raised ledge 51 is located on the face of the insert 14 around the periphery of the aperture 26 and flange 50. The raised ledge 51 serves to direct run off water down towards the bottom of the housing 16 and away from the face of the insert 14 and an appliance plug, if any, located in the receptacle outlet.

In this embodiment, the insert 14 has two apertures 52 and 54 capable of encompassing a standard electrical duplex outlet. Three threaded holes 56 are defined by the insert 14 in order to allow for the insertion of screws to fasten the insert 14 and the base plate 12 to an electrical outlet and the outlet box (not shown). The three holes are sized and adapted to conform to the standards for electrical outlets and boxes.

The protective housing 16 defines a substantially square shaped enclosure 66 capable of protecting at least one, and preferably more than one, electrical outlet receptacle with or without at least one electrical plug inserted thereto. The protective housing 16 has a top wall 68, a bottom wall 70, and two side walls 72 and 74. Two integral pins 76 are mounted in the arms 78 located along the top wall 68 of the protective housing 16. The pins 76 of the protective housing 16 act in cooperation with the hinges 28 of the base plate 12 to connect the protective housing 16 to the base plate 12. The hinges 28 and the pins 76 allow for movement of the bottom wall 70 of the protective housing 16 away from the bottom side 20 of the base plate 12 thereby allowing access to the electrical outlet. In this embodiment, the housing 16 is approximately 4 ¼ inches high, 4 ¼ inches wide, and 2 inches deep.

The bottom side 20 of the base plate 12 and the bottom wall 70 of the protective housing 16 define two gaps 80 and 82 through which an electrical cord may pass. Accordingly, an appliance plug may remain inserted into an electrical outlet receptacle while the housing 16 and the base plate 12 are closed together by the latching mechanism 30 thereby protecting the electrical receptacle and the inserted electrical plug from various weather conditions.

The base plate 12, the insert 14 and the protective housing 16 may be made from weather-resistant, rigid, electrically non-conductive materials such as polycarbonate, polystyrene or other plastic materials known to those skilled in the art. In a preferred embodiment, the base plate, the insert, and the housing are made of a polycarbonate Lexan 143 or 143R-112. Also, it is preferred that the protective housing is made of a translucent material to allow for observation of the interior of the assembly when in a closed position as in FIG. 1.

In FIG. 4, a gasket 84 with a generally square shape is shown. The gasket 84 defines a rectangular aperture 86. The rectangular aperture 86 is of sufficient size to encompass a standard electrical duplex outlet. The gasket 84 is used in conjunction with the base plate 12, insert 14 and housing 16 to provide a moisture resistant connection between the cover 10 and an electrical box. The gasket 84 is compressed between the underside of the base plate 12 and the surface of the outdoor electrical outlet or the surface around the electrical outlet box in order to prevent water or moisture from entering the box. The gasket 84 may be made of a water-resistant, compressible material allowing for a watertight connection between the base plate and the edge of an electrical outlet. In a preferred embodiment, the gasket 84 is made of a reclaimed or synthetic sponge rubber conforming to ASTM #D-1056-52TD12. However, the gasket 84 is not necessary to create a water-proof connection between the base plate and the electrical outlet, or the housing.

In protecting a vertically aligned outdoor electrical outlet, the gasket 84 is positioned against the surface around an electrical outlet so that the aperture 86 encompasses the electrical outlet. The base plate 12 is placed flush against the surface of the gasket 84. The insert 14 is fitted within the recess 40 of the base plate 12. The apertures 52 and 54 of the insert encompass the vertically aligned duplex electrical outlet such that the top edge 42 of the insert 14 runs parallel to the top side 18 of the base plate 12. The insert 14 is fastened through holes 56 to an electrical outlet and box thereby securing the base plate 12 and the gasket 84 which are interposed between the insert 12 and the outlet box. The protective housing 16 is fastened to the base plate 12 through the hinges 28 and the pins 76 and the latching mechanism 30.

In protecting a horizontally aligned outdoor electrical outlet, the gasket 84 and the base plate 12 are positioned as described above. The insert 14 is positioned within the recess 40 of the base 12 such that a horizontally aligned electrical duplex outlet is encompassed by the apertures 52 and 54 of the insert 14. In this arrangement, the top edge 42 of the insert 14 runs perpendicular to the top side 18 of the base plate 12. Similarly, the gasket 84, the base plate 12, the insert 14 and the protective housing 16 are connected as described above.

In operation, the gasket 84, the base plate 12 and the insert 14 encompass an outdoor electrical outlet. Electrical plugs may be inserted into the outlet receptacle. In a closed position, as shown in FIG. 1, gaps 80 and 82 of the protective housing 16 allow for electrical cords to pass through. Accordingly, an electrical connection is maintained while the assembly provides protection from varying weather conditions. To remove a plug, the protective housing 16 is opened by releasing the latching mechanism 30 thereby allowing access to the interior of enclosure 70.

This embodiment may also be used to enclose a switch. The gasket 84, the base plate 12 and the insert 14 may be positioned to encompass a toggle switch. The toggle switch may be of either a vertical or horizontal orientation and may be accommodated in a similar manner as a outlet receptacle, described above. The protective housing 16 will provide protection from the elements when in a closed position as shown in FIG. 1. By releasing the latching mechanism 30, the housing 16 may be repositioned to allow access to the toggle switch. By again closing the protective housing, the assembly will protect the switch from varying weather conditions.

Figures 7, 8:
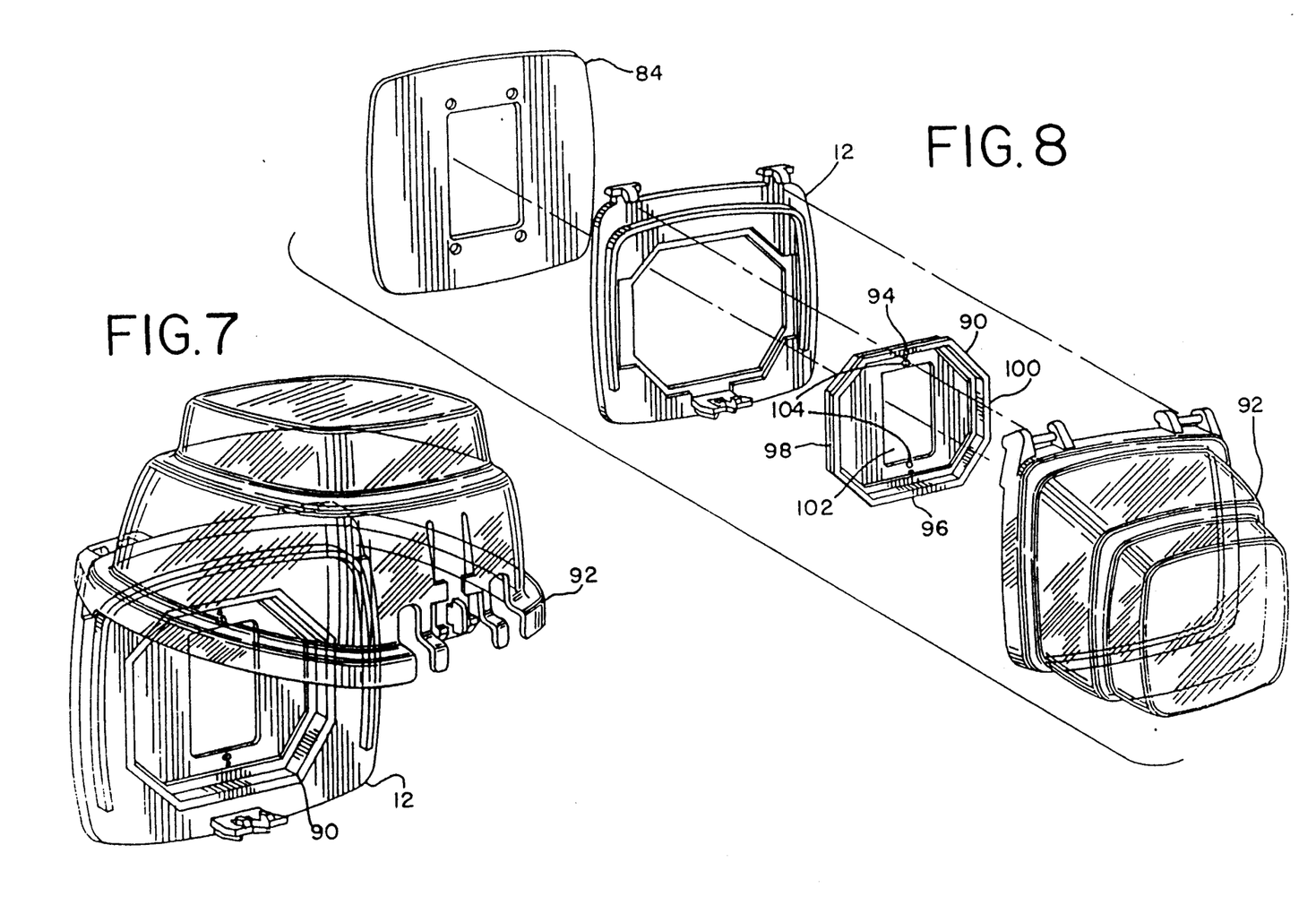
FIG. 7 is another perspective view of the second embodiment of FIG. 5.
FIG. 8 is a perspective view of the second embodiment of FIGS. 5-7 in an exploded relationship.

FIGS. 5-8 show a second embodiment of the weatherproof outdoor electrical outlet cover. The assembly 88 includes a base plate 12, an insert (in shadow) 90, and a protective housing 92. FIG. 8 shows a gasket 84 which is interposed between the base plate 12 and the electrical outlet box (not shown) thereby creating a water-proof connection. Again, the gasket 84 is not necessary to create a water-proof connection between the base plate 12 and the electrical outlet. The gasket 84 and the base plate 12 are described above in connection with FIGS. 1-4. In this embodiment, the insert 90 has a generally octagonal shape. The insert may also have a circular, polygonal, or any other shape without departing from the spirit of this invention. The insert 90 has a top edge 94, a bottom edge 96 and two side walls 98 and 100. The insert 90 has one aperture 102 of generally rectangular shape capable of encompassing a ground fault interrupter switch or a Decora style switch or the like. It should also be understood that different aperture shapes may be created to conform the insert to a wide variety of electrical switches and outlets such as single outlet receptacles, switch slots and the like. Two threaded holes 104 are defined by the insert 90 in order to allow for the insertion of screws to fasten the insert 90 and the base plate 12 to an electrical outlet (not shown). It should be recognized that any other type of connecting mechanism may be used without departing from the spirit of this invention. The insert 90 is sized and adapted to fit within the recess 40 of the base plate 12. The insert may be positioned in a plurality of orientations to enclose a vertically or horizontally aligned electrical outlet as described above.

In the embodiment illustrated in FIGS. 5-8, the protective housing 92 has greater depth and a tapered surface in order to provide a large electrical outlet enclosure. This is to accommodate larger plugs or cords. In this embodiment, the housing 92 has a depth of approximately 3 inches.

In the above described embodiments, the insert (14 and 90) is described as having a shape so that it can be fitted in the aperture 26 of the base plate 12 in at least two orientations 90° apart to accommodate electrical receptacle outlets oriented either horizontally or a vertically. This feature is preferred because it allows a single insert to be used in either orientation and therefore is economical and efficient. It can be appreciated however that a similar benefit could be obtained by providing two separate inserts each that could be positioned in the base plate in only one orientation. One of the inserts would have openings for a horizontally oriented receptacle and the other insert would have openings for a vertically oriented receptacle. Thus, the same base plate and housing could be used, but separate inserts would be provided. This would not be as advantageous or preferred, but it would provide the ability to accommodate both types of receptacle outlet orientations with mostly the same parts.

According to another feature of the present invention, there is provided an improved latching mechanism for use with an outdoor weather resistant outlet cover. Referring again to FIGS. 1-4, as mentioned above, the outlet cover 10 includes a latching mechanism 30. The latching mechanism 30 includes a first mating element 132 centrally located along the bottom edge 20 of the base plate 12 and a second mating element 134 located along the bottom wall 70 of the protective housing 16 and corresponding to the first mating element 132. The first mating element 132 includes a slot 136 located in a forwardly extending projection 138. The second mating element 134 includes a downwardly extending pin 140 located on a flexible, resilient, rearwardly extending tab member 142. The downward extending pin 140 has an inclined edge 143 facing rearwardly in the direction of the base plate 12 and the corresponding mating element 132 located thereon. A release button 144 is located on the flexible tab member 142 adjacent to the downward extending pin 140. The release button 144 also extends downwardly. In a preferred embodiment, the components of the first mating member 132 are formed integral to the base plate 12 and the components of the second mating member 134 are formed integral to the housing 16. Alternatively, some or all of these components may be formed separately and affixed to their mating members by adhesives or other means.

In operation, when the housing 16 is brought down into a closed position on the base plate 12, the downward extending pin 140 is positioned in the slot 136. With the pin 140 in the slot 136, the housing 16 is securely latched to the base plate 12. The tab member 142 is sized and adapted so that it can be resiliently deformed by movement upward to enable the downward extending pin 140 to be fitted into the slot 136. Preferably, the tab member 142 remains in a state of deformation so as to bias the downward extending pin 140 into the slot 136. The inclined edge 143 of the downward extending pin 140 may facilitate riding over an edge of the forwardly extending projection 138 to slide into the slot 136. Thus, when the housing 16 is brought down into a closed position on the base plate 12, the housing 14 remains in a secured, closed position. With the housing 16 secured, the receptacle and the appliance plugs located therein, if any, are maintained in a secure, weather resistant enclosure. Furthermore, with the latching mechanism 30 provided, the housing 16 is positively closed and will not tend to open unintentionally or accidentally, for example, by someone inadvertently pulling on the appliance cord. This has particular advantage for use with appliances that will be left plugged into the outdoor receptacle for extended periods of time.

In order to open the housing 16, the release button 144 is pressed in an upward direction. This bends the flexible tab 142 upwardly removing the pin 140 from the slot 136. Then the housing 16 can be lifted.

Accordingly to a further feature of this aspect of the invention, the release button 144 is removable. This is provided by making a portion of the release button 144 narrow near its connection to the flexible tab member 142 on the housing 16 so that it can be broken off by bending it sharply or by means of a cutting tool. When the release button 144 is removed from the tab member 142, the release button 144 is relatively inaccessible positioned above the forwardly projecting tab 138. Thus, when the housing 16 is in a closed position, the housing 16 cannot readily be opened without a tool. This affords an even higher level of security to the device so that the housing 16 can be maintained in closed position. This also has the benefit that an appliance plugged into the receptacle outlet is also secured, i.e. it cannot be removed. In order to open the housing 16, a screw driver can be inserted into the latching mechanism 30 between the forwardly projecting member 138 and the release button 144 lever the release button 144 upwardly to permit the pin 140 to be removed from the slot 136 thereby allowing the housing 16 to be opened.

In the above described embodiments, inserts have been described that are adapted to be fitted over single-gang outlets either of the standard type or of the GFI or Decora type. With each of these types of inserts, the inserts can be positioned in the base plate in either of at least two orientations in order to accommodate an outlet of either a vertical or horizontal orientation. In further alternative embodiments, it can be appreciated that other inserts may be provided. For example, an insert may be provided for a two-gang outlet, i.e. two duplex outlets side by side. Alternatively, an insert may be provided for a two-gang GFI or Decora outlet, in a side by side arrangement. In two-gang insert alternatives, an octagonally shaped insert may be provided that can be positioned in the base plate in either of at least two orientations to accommodate two-gang outlets oriented either horizontally or vertically. In a preferred embodiment, the insert for a two-gang outlet would be sized and adapted to fit into a base plate such as described above that is suitable for use with a single-gang outlet. Thus, to provide a two-gang cover, the same housing and base plate could be used as in the single-gang cover, and only the insert and the gasket would be different.

In yet further embodiments, additional alternative inserts could also be provided to accommodate types of electrical service devices other than receptacles, such as switches, combinations of switches and outlets, pilot lights, or other service devices and combinations thereof. In each alternative, only the insert and maybe the gasket would be different; the housing and the base plate would be the same. Thus, an entire family of devices can be accommodated with a minimal plurality of parts.

The above-described embodiments have been described for use in an outdoor environment; however, it should be understood that the present invention may be used in other locations subject to varying or adverse conditions, such as porches, garages, sheds, barns, decks, greenhouses, etc.

The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. An outdoor weatherproof protective electrical outlet cover adapted to be attached in weatherproof connection to an electrical outlet comprising:
   (a) a base plate adapted to be attached in weatherproof connection with the electrical outlet, the base plate having an aperture of sufficient size to accommodate the electrical outlet positioned in a first orientation and a second orientation wherein only one electrical outlet orientation can be accommodated at a given time;
   (b) an insert sized an adapted to fit within the aperture of the base plate in a first orientation and a second orientation, the insert being of sufficient size to accommodate one electrical outlet orientation;
   (c) a protective housing defining a closed space enclosing the electrical outlet even with at least one electrical plug present, the protective housing adapted to be mounted to the base plate.

2. An outdoor protective electrical outlet cover according to claim 1 wherein the base plate aperture is of substantially octagonal shape.

3. The outdoor protective electrical outlet cover according to claim 1 wherein the base plate aperture is of sufficient size to enclose an electrical outlet positioned in a first substantially vertical position and a second substantially horizontal position wherein only one position can be accommodated at a given time.

4. The outdoor protective electrical outlet cover according to claim 1 wherein the insert is of sufficient size to accommodate a plurality of electrical plug receptacles.

5. The outdoor protective electrical outlet cover according to claim 1 wherein the insert has an aperture that is substantially rectangular.

6. The outdoor protective electrical outlet cover according to claim 5 wherein the base plate has a top edge with a fastening means attached to the top edge.

7. The outdoor protective electrical outlet cover according to claim 6 wherein the insert defines a top edge and a bottom edge and two side edges with the top edge of the insert running perpendicular to the top edge of the base plate.

8. The outdoor protective electrical outlet cover according to claim 6 wherein the insert defines a top edge and a bottom edge and two side edges with the top edge of the insert running parallel to the top edge of the base plate.

9. The outdoor protective electrical outlet cover according to claim 6 wherein the protective housing is mounted by a hinge mechanism to the base plate.

10. The outdoor protective electrical outlet cover according to claim 1 wherein the protective housing comprises a translucent material.

11. The protective electrical outlet cover according to claim 1 wherein the base plate and the protective housing define a gap through which an electric cord may pass.

12. An improved outdoor electrical outlet cover comprising, a base plate fastened to a weather resistant electrical outlet housing adapted to cover an electrical outlet, the improvement comprising:
   (a) a base plate adapted to be attached in weatherproof connection with the electrical outlet, the base plate having an aperture of sufficient size to accommodate an electrical outlet positioned in a first orientation and a second orientation wherein only one electrical outlet orientation can be accommodated at a given time;
   (b) an insert adapted to be accommodated within the aperture of the base plate in a first orientation and a second orientation, the insert being of sufficient size to accommodate one electrical outlet orientation;
   (c) a protective housing defining a closed space enclosing the electrical outlet even with at least one electrical plug present, the protective housing adapted to be mounted to the base plate.

13. An outdoor weatherproof protective electrical outlet cover adapted to be attached in weatherproof connection to an electrical outlet comprising:
   (a) a base plate adapted to be attached to an electrical outlet, the base plate having a top edge and a bottom edge, the base plate having an aperture of sufficient size to accommodate an electrical outlet of any orientation;
   (b) an insert adapted to fit within the aperture of the base plate, the insert having an aperture of sufficient size to enclose one electrical outlet orientation;
   (c) a protective housing adapted to be attached to the base plate, the protective housing defining a gap opposite the top edge of the base plate whether enclosing a vertically positioned electrical outlet or a horizontally positioned electrical outlet.

14. A weather resistant outlet cover for a electrical service device mounted in an electric box comprising:
   a base adapted to be mounted in a moisture resistant connection around the electrical box;
   a housing pivotally connected to the base along an upper portion thereof and adapted to provide a moisture resistant enclosure in front of the electrical service device; and
   an insert adapted to be mounted in the base and further in which the insert includes at least an aperture therein conforming in size and shape to the electrical service device.

15. The outlet cover of claim 14 in which the insert is adapted to be positioned in the base in more than one orientation.

16. The outlet cover of claim 15 in which the service device is a receptacle and the insert is adapted to be positioned in the base in a first orientation to accommodate a vertically oriented receptacle and in a second orientation to accommodate a horizontally oriented receptacle.

17. The outlet cover of claim 16 in which the housing is sized and adapted to accommodate an appliance cord plug to be inserted in the receptacle while the housing is in a closed position with respect to the base and further in which a gap is located between the cover and the base along a side opposite from the pivotal connection in order to allow the appliance cord to extend therethrough.

18. The outlet cover of claim 14 in which the insert is adapted to accommodate an electrical switch.

19. A weather resistant outlet cover for an electrical service device comprising:
   a base adapted to be mounted in a moisture resistant connection around the electrical service device;
   a housing pivotally connected to the base along an upper portion thereof and adapted to provide a moisture resistant enclosure in front of the electrical service device;
   an insert adapted to be mounted in the base and further in which the insert includes at least an aperture therein conforming in size and shape to the electrical service device; and
   a latching mechanism for releasably fixing the housing in a closed position with respect to the base so that access to the service device is prevented, the latching mechanism comprising:
   a slotted member located on one of the base and the housing;
   a biased pin located on the other of the base and the housing, the biased pin insertable into and biased in the direction of the slotted member to secure the housing and the base together when the biased pin is located in the slotted member; and
   a release button associated with the biased pin and adapted to facilitate moving the pin in opposition to the biasing to locate the biased pin out of the slotted member to enable movement of the housing from the closed position with respect to the base to an open position with respect to the base in which a plug may be removed from the receptacle.

* * * * *

UNITED STATES PATENT AND TRADEMARK OFFICE
CERTIFICATE OF CORRECTION

PATENT NO. : B1 5,280,135
DATED : January 20, 1998
INVENTOR(S) : Berlin et al.

It is certified that error appears in the above-indentified patent and that said Letters Patent is hereby corrected as shown below:

In Claim 14, line 10, delete "*with*" and replace with --*within*--

Signed and Sealed this

Twenty-first Day of July, 1998

Attest:

BRUCE LEHMAN

*Attesting Officer*   *Commissioner of Patents and Trademarks*

:

REEXAMINATION CERTIFICATE (3426th)
United States Patent [19]
Berlin et al.

[11] B1 5,280,135
[45] Certificate Issued Jan. 20, 1998

[54] OUTDOOR ELECTRICAL OUTLET COVER

[75] Inventors: Donald M. Berlin; Julius R. Rosenski, both of McHenry, Ill.

[73] Assignee: Intermatic Incorporated, Spring Grove, Ill.

Reexamination Requests:
No. 90/003,974, Sep. 21, 1995
No. 90/004,132, Feb. 9, 1996

Reexamination Certificate for:
Patent No.: 5,280,135
Issued: Jan. 18, 1994
Appl. No.: 742,743
Filed: Aug. 9, 1991

[51] Int. Cl.$^6$ .................................................. H01R 13/447
[52] U.S. Cl. .................................................. 174/67; 439/147
[58] Field of Search ............................ 174/67; 220/242; 439/142, 144, 147, 136

[56] References Cited

U.S. PATENT DOCUMENTS

| | | | |
|---|---|---|---|
| D. 273,084 | 3/1984 | Henkel | D8/353 |
| D. 289,602 | 5/1987 | Williams, Jr. | D8/353 |
| 824,700 | 7/1906 | Avery. | |
| 1,282,317 | 10/1918 | Terrell. | |
| 1,517,684 | 12/1924 | Recker | 439/536 |
| 1,752,322 | 4/1930 | Adam. | |
| 2,287,661 | 6/1942 | Bone et al.. | |
| 2,383,621 | 8/1945 | Schonitzer et al. | 248/311.2 |
| 2,415,602 | 2/1947 | Monaco | 174/67 |
| 2,439,708 | 4/1948 | Abraham. | |
| 2,465,078 | 3/1949 | Fitzgerald. | |
| 2,465,079 | 3/1949 | Fitzgerald. | |
| 2,510,745 | 6/1950 | Kilgore | 174/48 |
| 2,526,606 | 10/1950 | Gregg | 174/67 |
| 2,656,948 | 10/1953 | McGee. | |
| 2,761,112 | 8/1956 | Torcivia | 439/147 |
| 2,880,264 | 3/1959 | Ruskin | 174/67 |
| 2,916,733 | 12/1959 | Hirsch | 340/545 |
| 2,980,283 | 6/1961 | Bentsen | 220/241 |

(List continued on next page.)

FOREIGN PATENT DOCUMENTS

| | | |
|---|---|---|
| 3710306 A1 | 10/1988 | Germany. |
| 50-59593 | of 1975 | Japan. |
| 51-16865 | of 1976 | Japan. |
| 51-29980 | of 1976 | Japan. |
| 54-15192 | of 1979 | Japan. |
| 55-23753 | 2/1980 | Japan. |
| 55-23754 | 2/1980 | Japan. |
| 55-97112 | 7/1980 | Japan. |
| 55-97113 | 7/1980 | Japan. |
| 63-105416 | of 1988 | Japan. |
| 254498 | 7/1926 | United Kingdom. |
| 326499 | 3/1930 | United Kingdom. |
| 939117 | 10/1963 | United Kingdom. |
| 1470093 | 4/1977 | United Kingdom. |
| 1529788 | 10/1978 | United Kingdom. |
| 1580037 | 11/1980 | United Kingdom. |
| 2 151 859 | 7/1985 | United Kingdom. |

OTHER PUBLICATIONS

Egatube Catalog, published Feb. 1980.

*Primary Examiner*—Kristine Kincaid

[57] ABSTRACT

An outdoor weatherproof protective electrical outlet cover adapted to be attached in weatherproof connection to an electrical outlet comprising a base plate adapted to be attached in weatherproof connection with the electrical outlet, the base plate having an aperture of sufficient size to accommodate the electrical outlet positioned in a first orientation and a second orientation wherein only one electrical outlet orientation can be accommodated at a given time, an insert sized and adapted to fit within the aperture of the base plate in a first orientation and a second orientation, the aperture being of sufficient size to accommodate one electrical outlet orientation, and a protective housing defining a closed space enclosing the electrical outlet with at least one electrical plug present, the protective housing adapted to be mounted to the base plate. Also included is a latching mechanism for an outdoor outlet cover adapted to secure the housing in a closed position with respect to the base and having an optionally removable release button to facilitate opening of the cover.

U.S. PATENT DOCUMENTS

| | | | |
|---|---|---|---|
| 2,984,725 | 5/1961 | Hubbell et al. | 200/302.3 |
| 2,997,520 | 8/1961 | Kinsman | 174/67 |
| 3,028,467 | 4/1962 | Hubbell | 200/302.3 |
| 3,067,402 | 12/1962 | Thaw | 439/359 |
| 3,131,985 | 5/1964 | Blonder | 439/133 |
| 3,137,407 | 6/1964 | Mackiewicz | 220/242 |
| 3,140,344 | 7/1964 | Slater et al. . | |
| 3,189,212 | 6/1965 | Bellek . | |
| 3,199,063 | 8/1965 | Stuart . | |
| 3,200,989 | 8/1965 | Hubbell | 220/242 |
| 3,236,990 | 2/1966 | Bates | 200/302.3 |
| 3,252,611 | 5/1966 | Weitzman et al. | 200/242 |
| 3,288,910 | 11/1966 | Zerwes | 174/53 |
| 3,334,172 | 8/1967 | Ryerson . | |
| 3,392,228 | 7/1968 | Zerwes | 174/52.1 |
| 3,467,763 | 9/1969 | Shaw | 174/67 |
| 3,613,044 | 10/1971 | Rarick . | |
| 3,618,804 | 11/1971 | Krause | 220/242 |
| 3,716,815 | 2/1973 | Riches | 439/142 |
| 3,773,969 | 11/1973 | Geisel . | |
| 3,781,495 | 12/1973 | Splingaerd | 174/67 |
| 3,792,414 | 2/1974 | Smith . | |
| 3,811,004 | 5/1974 | Moore . | |
| 3,885,852 | 5/1975 | Grove | 174/55 |
| 3,917,899 | 11/1975 | Oliver | 174/55 |
| 4,031,312 | 6/1977 | Coleman et al. | 174/52.1 |
| 4,045,108 | 8/1977 | Olsen | 439/368 |
| 4,063,110 | 12/1977 | Glick | 307/112 |
| 4,070,078 | 1/1978 | Chrones | 439/142 |
| 4,102,466 | 7/1978 | Jadatz . | |
| 4,105,274 | 8/1978 | Casey | 439/368 |
| 4,109,095 | 8/1978 | Kling et al. | 174/67 |
| 4,134,516 | 1/1979 | Sullo | 220/242 |
| 4,135,337 | 1/1979 | Medlin | 52/221 |
| 4,163,503 | 8/1979 | McKinnon . | |
| 4,197,959 | 4/1980 | Kramer | 220/242 |
| 4,265,365 | 5/1981 | Boteler | 220/3.3 |
| 4,291,817 | 9/1981 | Spitzer et al. . | |
| 4,342,493 | 8/1982 | Grenell | 439/142 |
| 4,345,693 | 8/1982 | Balkwill et al. | 220/3.3 |
| 4,381,063 | 4/1983 | Leong | 220/242 |
| 4,424,407 | 1/1984 | Barbic | 174/67 |
| 4,484,021 | 11/1984 | Schaefer et al. | 174/53 |
| 4,500,008 | 2/1985 | Cook | 220/242 |
| 4,505,403 | 3/1985 | Bowden, Jr. et al. | 220/242 |
| 4,603,931 | 8/1986 | Ruffman | 439/133 |
| 4,603,932 | 8/1986 | Heverly | 439/147 |
| 4,605,817 | 8/1986 | Lopez | 174/67 |
| 4,654,470 | 3/1987 | Feldman et al. . | |
| 4,697,720 | 10/1987 | Hotchkiss et al. . | |
| 4,733,330 | 3/1988 | Tanaka et al. | 361/641 |
| 4,801,035 | 1/1989 | Sugiyama et al. . | |
| 4,803,307 | 2/1989 | Shotey | 174/67 |
| 4,851,612 | 7/1989 | Peckham | 439/136 |
| 4,874,906 | 10/1989 | Shotey | 174/67 |
| 4,915,638 | 4/1990 | Domian | 439/142 |
| 4,922,056 | 5/1990 | Larsson | 174/65 R |
| 4,947,281 | 8/1990 | Boteler | 174/53 |
| 4,979,634 | 12/1990 | Begley | 174/67 |
| 4,988,832 | 1/1991 | Shotey | 174/67 |
| 5,010,211 | 4/1991 | Bartee | 174/48 |
| 5,045,640 | 9/1991 | Riceman | 174/67 |
| 5,124,876 | 6/1992 | Misencik et al. | 361/117 |
| 5,135,411 | 8/1992 | Wiley et al. | 439/535 |
| 5,218,169 | 6/1993 | Riceman | 174/67 |
| 5,280,135 | 1/1994 | Berlin et al. | 174/67 |
| 5,456,373 | 10/1995 | Ford | 220/242 |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–13 and 19 is confirmed.

Claim 14 is determined to be patentable as amended.

Claims 15–18, dependent on an amended claim, are determined to be patentable.

14. A weather resistant outlet cover for a electrical service device mounted in an electric box comprising:
- a base adapted to be mounted in a moisture resistant connection around the electrical box, *said base having an aperture therein*;
- a housing pivotally connected to the base along an upper portion thereof and adapted to provide a moisture resistant enclosure in front of the electrical service device; and
- an insert adapted to be [mounted] *accommodated with the aperture* in the base and further in which the insert includes at least an aperture therein conforming in size and shape to the electrical service device.

* * * * *